United States Patent [19]

Brodnitz et al.

[11] 3,751,269

[45] *Aug. 7, 1973

[54] IMPARTING ONIONY FLAVOR TO FOODSTUFFS WITH THIO-COMPOUNDS

[75] Inventors: Michael H. Brodnitz, Matawan; John V. Pascale, Old Bridge; Manfred H. Vock, West Orange, all of N.J.

[73] Assignee: International Flavors & Fragrances Inc., New York, N.Y.

[ * ] Notice: The portion of the term of this patent subsequent to Aug. 22, 1989, has been disclaimed.

[22] Filed: Jan. 7, 1971

[21] Appl. No.: 104,758

Related U.S. Application Data

[63] Continuation-in-part of Ser. No. 13,816, Feb. 24, 1970, Pat. No. 3,686,323.

[52] U.S. Cl. ............................ 99/140 R, 260/607 R
[51] Int. Cl. ........................ A23l 1/26, C07c 151/00
[58] Field of Search ................ 99/140 R; 260/607 R

[56] References Cited
UNITED STATES PATENTS 3,686,323   8/1972   Brodnitz et al. .................... 260/607

OTHER PUBLICATIONS

Brodnitz et al., "Thiopropanal-S-Oxide: A Lachrymatory Factor in Onions," J. Agr. & Fd. Chem., Vol. 19, No. 2 (1971) pp. 269–272

Sheppard et al., "Sulfines," J. Am. Chem. Soc., Vol. 86, No. 9 (1964) pp. 1891 & 1892.

Carson, "Onion Flavor," Chemistry & Physiology of Flavors, AVI Pub. Co., Westport, Conn. (1967) pp. 390–405.

Bernhard, "The Sulfur Components of Allium Species As Flavoring Matter," Qual. Plant. Mater. Veg. XVIII, 1–3 (1969) pp. 72–84.

Primary Examiner—Morris O. Wolk
Assistant Examiner—Sidney Marantz
Attorney—Brooks, Haidt & Haffner

[57] ABSTRACT

Onion flavoring compounds, including thioalkanal-S-oxides and alkyl alkene thiosulfonates, methods for preparing and using such compounds, and compositions so obtained.

4 Claims, No Drawings

IMPARTING ONIONY FLAVOR TO FOODSTUFFS WITH THIO-COMPOUNDS

This application is a continuation-in-part of our co-pending application, Ser. No. 13,816, filed Feb. 24, 1970 now United States Letters Patent No. 3,686,323.

BACKGROUND OF THE INVENTION

This invention relates to products and processes for conferring fresh onion-like flavors on, and improving such flavors in, foodstuffs.

Considerable effort has been devoted to obtaining materials which can be added to foodstuffs for the purpose of providing pleasant flavors to foodstuffs. In many instances it is desirable to provide natural flavors to foods, and onions are a widely used natural material for improving or modifying the flavor of a wide variety of foodstuffs. Accordingly, there has been considerable interest in finding methods for simulating various aspects of onion flavor in foods.

*Acta Chemica Scandinavica*, 17, 641–650 (1963) describes attempts to isolate the so-called lachrymatory factor from natural onions. The lachrymatory factor precursor was said to be (+)—S—(prop-l-enyl)-L-cysteine sulfoxide.

*Cornell Experiment Station Memoir* 385 stated that the structure which fitted their observations concerning the lachrymatory factor was thiopropional-S-oxide, although it was not isolated, and a possible precursor compound was suggested. In *J.A.C.S.* 86, 1891 (1964) an attempt was made to prepare thioacetone-S-oxide, but efforts to isolate this product were unavailing.

Disproportionation of aryl and methyl thiosulfinates to disulfides and thiosulfonates has been shown by Backer et al., *Receuil*, 73, 129 (1954) and this work has been noted by Carson at pages 390–393 in Shultz et al., *Chemistry and Physiology of Flavors*, Westport, Connecticut, U.S.A.: Avi Publishing Company 1967. Thiosulfonates from garlic are also mentioned by Carson at pages 136–138 in Hornstein, *Flavor Chemistry*, Washington, D. C., U.S.A.: American Chemical Society 1966. Backer shows the preparation of certain dialkyl thiosulfonates in *Receuil*, 67, 902 (1948).

THE INVENTION

Briefly, the present invention provides novel products and processes for improving the flavor and general organoleptic properties of foodstuffs. It has been found possible to prepare thioalkanal-S-oxides having the formula R=S=O, wherein R represents an alkylidene radical having from two to six carbons atoms, by the reaction of alkyl sulfinyl halide with a tertiary amine. The compounds so obtained can be added to foodstuffs directly, or they can be permitted to undergo further rearrangement or reaction to provide a material having a fresh alliaceous flavor character. This material which contains alkyl alkene thiosulfonates can also be added to food flavoring compositions or foodstuffs, as hereinafter more fully described. The alkylidene group is desirably straight-chain, and preferred alkylidene groups include ethylidene, n-propylidene, n-butylidene, n-hexylidene, and the like. Novel thiosulfonates and processes for their production are also contemplated herein.

Thiopropanal-S-oxide obtained according to the present invention is a colorless liquid having a boiling point of 30° C at 0.10 mm Hg and a strong lachrymatory odor characteristic. The structure of this material is confirmed by proton magnetic resonance (PMR), gas-liquid chromatography (GLC), and infrared (IR) and mass spectroscopy. If the substance is kept at room temperature (25° C) for 2 hours, it spontaneously reacts to form a material having a fresh onion odor and flavor, but if the substance is kept at 0° C, it is stable for a period of at least 2 weeks.

Thiobutanal-S-oxide, $CH_3—CH_2—CH_2—CH=S=O$, is a liquid with a lachrymatory aroma. PMR spectroscopy confirms this structure.

Thiohexanal-S-oxide, $CH_3\text{-}CH_2\text{-}CH_2\text{-}CH_2\text{-}CH_2\text{-}CH=S=O$, is a clear liquid boiling at 30° C under 0.3 mm Hg. Its PMR spectrum is consistent with the structure as aforesaid.

Thioethanal-S-oxide, $CH_3\text{-}CH=S=O$, is a liquid with lachrymatory character, as are all of the thioalkanal-S-oxides prepared according to the present invention. Its structure is confirmed by PMR and mass spectroscopy.

Propyl propene thiosulfonate, $CH_3\text{-}CH_2\text{-}CH_2\text{-}SO_2\text{-}S\text{-}CH=CH\text{-}CH_3$ and $CH_3\text{-}CH_2\text{-}CH_2\text{-}S\text{-}SO_2\text{-}CH=CH\text{-}CH_3$, obtained according to the present invention is a liquid boiling at 90° C at 0.05 mm Hg and having a pronounced aroma and flavor of fresh, uncooked onions. The structure of this material is confirmed by GLC, PMR, IR and mass spectroscopy.

The thioalkanal-S-oxides are prepared by reacting an alkyl sulfinyl halide with a tertiary amine. It is possible to prepare the thioalkanal-S-oxides at temperatures as high as room temperature, up to about 30° C, but after the product is formed further recovery, purification, and/or isolation steps should be carried out at temperatures substantially below the freezing point of water, and more specifically, below about −15° C.

The reaction itself is desirably carried out at temperatures below −15° C in order to control the reaction and avoid the formation of unwanted by-products. At temperatures which are too low, the reaction will not proceed at a detectible rate, so it is desirable to carry out the reaction at temperatures above −80° C. Accordingly, it is desirable to carry out the reaction at from −15° to −80° C. It has been found that a good balance between yield, reaction time, and ease of production can be obtained in the preferred temperature range of from −15° to −30° C.

In order to moderate the course of the reaction and provide good contact between the reactants, it is desirable that the reaction be carried out in the presence of an inert reaction vehicle. Reaction vehicles for use in the present invention should be inert to and compatible with the reactants and should remain in a mobile liquid condition at the temperatures of reaction. They should also be readily separable from the S-oxide obtained according to the reaction. Reaction vehicles suitable for use in the practice of this invention include halogenated hydrocarbons such as carbon tetrachloride, trichlorofluoromethane, dichlorodifluoroethane, chlorotrifluoromethane, dichlorotetrafluoroethane, carbon tetrachloride, and the like materials; aromatic hydrocarbons such as benzene, toluene, xylene, and the like; aliphatic hydrocarbons such as pentane, hexane, isopentane, and the like; alicyclic hydrocarbons such as cyclohexane and the like; and aliphatic ethers such as ethyl ether, methyl ethyl ether, methyl propyl ether, and the like.

It is desirable that the alkyl sulfinyl chloride be relatively pure, and purities of at least 90 percent are preferred. The alkyl group of the starting material corresponds to the alkylidene group in the final S-oxide. Thus, propyl sulfinyl chloride provides propanal-S-oxide and so on. Such sulfinyl chloride starting materials can readily be obtained by conventional methods known in the art, e.g., the procedure set forth at Organic Syntheses, Vol. 40, pp. 62–65 (1960).

It is desirable to combine the alkyl sulfinyl chloride and amine slowly so that adequate control of the reaction temperature can be maintained. In a preferred reaction procedure the amine is dispersed or dissolved in the reaction vehicle and the sulfinyl chloride is added until a stoichiometric or somewhat lower amount has been added. It is preferred that the molar ratio of chloride to amine be from 0.8/1 to 1.2/1. The reaction can be carried out under pressures which are above or below normal atmospheric pressure. Superatmospheric pressures are used with low-boiling vehicles, e.g., chlorotrifluoromethane, carbon tetrachloride, to suppress ebullition. It is generally preferred to carry out the reaction under normal atmospheric pressures.

Gaseous materials which would interfere with the course of the reaction should be excluded from contact with the reactants and the reaction vehicle. Accordingly, oxygen should be excluded from the reaction, and in this connection a blanket of inert gas such as nitrogen is preferably used.

The amines used in producing the S-oxides according to the invention are tertiary alkyl amines, which form hydro chloride amine salts. Thus, the structures contemplated include not only compounds of the formula $N(R_2)_3$, wherein $R_2$ is a lower alkyl group having up to six carbon atoms and is preferably methyl or ethyl, but also cyclic tertiary amines having the formula

wherein $R_3$ is a lower alkylene group having up to four carbon atoms and is preferably a trialkylene diamine such as triethylene diamine. As used herein, tertiary amines will accordingly be taken to include such materials.

While thiopropanal-S-oxide or the other thioalkanal-S-oxides cannot long be maintained at room temperature, in one aspect of the present invention the material is permitted to stand at room temperature to form a product which has lost some or all of the lachrymatory character but which in turn provides a good fresh onion or other alliaceous flavor and aroma character. The product obtained upon standing of the S-oxide at room temperature or above is formed by rearrangement or further reaction of the S-oxide, and for convenience this will hereinafter be referred to as rearrangement. The rearrangement product is itself useful as a flavoring material in foodstuffs and flavoring compositions.

In the case of thiopropanal-S-oxide the rearrangement product forms upon exposure to temperatures above those at which the material is stable, as hereinafter noted. Thus, the rearrangement product forms from the thiopropanal-S-oxide upon standing for 2 hours at 25° C or 30 minutes at 50° C. This rearrangement product has a strong fresh onion flavor. The rearrangement product from thiopropanal-S-oxide, for example, contains, in a ratio of 0.6:1:1, 3-pentenal, propyl propane thiosulfonate, and propyl propenyl thiosulfonate having the structure

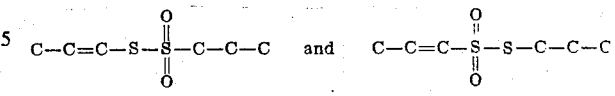

It has also been found that the propyl propenyl thiosulfonate and other thiosulfonates can be prepared from the corresponding disulfides by an oxidation reaction, preferably by treatment with hydrogen peroxide or a peralkanoic acid, such as peracetic acid and the like. The alkyl alkenyl disulfide is reacted to provide the corresponding alkyl alkene thiosulfonate. Lower thiosulfonates having from two to four carbon atoms on each side of the thiosulfonate grouping are desirable, and the preferred groups contain three carbon atoms, namely, propyl and propenyl.

The hydrogen peroxide utilized should be relatively concentrated and desirably contains from 25 to 80 percent hydrogen peroxide. Hydrogen peroxide having a concentration of 30 to 50 percent is preferred. The hydrogen peroxide or other oxidizing agent is utilized in about stoichiometric proportions that is, about two moles of agent for each mole of disulfide. It is desirable to carry out this reaction in the presence of an inert vehicle, such as a lower alkanoic acid having from two to four carbon atoms, to provide better control and moderation of the reaction. A preferred reaction vehicle is acetic acid.

The reaction is carried out at a temperature which will provide a satisfactory reaction rate, but which will not promote an overly vigorous reaction of the peroxide. Thus, temperatures below about 20° C are desirable, but it is not generally beneficial to carry out the reaction below about 0° C, so that temperatures of about 0° to less than 20° C are desirably used. It is preferred to utilize temperatures of 10°–15° C. The pressure of the reaction can be subatmospheric or superatmospheric, and atmospheric pressures are desirably used.

After the reaction has been carried out for from 15 minutes to two hours to provide a high degree of completion, the temperature can be slowly raised to room temperature and thence to about 50° C or so to provide substantially complete reaction, but without allowing a sharp exothermic temperature increase. The product is then purified, isolated, and/or recovered by conventional techniques, as by distillation, extraction, preparative chromatographic techniques, crystallization, and the like. The material is preferably purified by chromotographic techniques when separation of the pure products is desirable.

The compositions and products of the present invention can be used for providing onion flavor to foodstuffs including comestible liquids such as broths and other beverages. They can also be used to enhance, vary, alter, modify, fortify, and/or improve the flavors of foodstuffs. This invention is accordingly useful with foodstuffs such as soups and soup mixes, casserole dishes, canned and frozen meats and vegetables, animal and pet foods and other veterinary products, sauces, gravies, broths, stews, simulated meat and dairy products, dietetic products, baked goods, and the like products, as further described herein.

In accordance with a further of the present invention, the S-oxide or rearrangement product is utilized per se or in combination with other edible materials to impart the desired fresh inion organoleptic impression to foods or other edible materials. Thus, the mixtures herein described can comprise flavor compositions and flavor-enhancing compositions. It will be understood herein that a flavoring composition is one capable of imparting a definite, complete flavor to a tasteless or bland foodstuff, as well as one capable of reinforcing one or more flavor notes of a natural or other food material which is deficient in such flavor note.

Such flavoring compositions would be useful for improving the flavor of, say, a dehydrated onion product, the flavor of which had been diminished or altered undesirably by the dehydration and/or other processing. It will accordingly be understood that the products of this invention can be admixed with other flavoring ingredients, carriers, vehicles, and the like to form compositions suitable for imparting a flavor to, enhancing the flavor in, or altering the flavor of, a food composition, and such food compositions and the methods for preparing them are also contemplated herein.

When the materials of this invention are used in flavoring compositions to enhance existing flavors in, or to provide the entire flavor impression to, a foodstuff, the materials can be combined with organic acids including fatty, saturated, unsaturated, and amino acids, alcohols, including primary and secondary alcohols, esters, carbonyl compounds including aldehydes and ketones, lactones, cyclic organic materials including benzene derivatives, alicyclics, heterocyclics such as furans, pyridines, pyrazines, and the like, other sulfur-containing materials including thiols, alkyl and alkylene mono- and higher sulfides and the like, proteins, lipids, carbohydrates, and so-called flavor potentiators such as monosodium glutamate, and the like. It will be appreciated that the types and amounts of materials selected from the foregoing groups will depend upon the precise organoleptic character desired in the finished product and, especially in the case of flavoring compositions used to enhance other flavors, will vary according to the foodstuffs to which the flavor and aroma are to be imparted. Inorganic materials such as sodium chloride, and freshness preservers such as butylated hydroxyanisole, butylated hydroxytoluene, and propyl gallate can be added for their adjuvant or preservative effects on the flavoring compositions or upon the final food composition itself.

As noted above, it can also be desirable to utilize carriers or thickners such as gum arabic, carrageenen, gum tragacanth, guar gum and the like, or vehicles such as ethyl alcohol, water, propylene glycol, and the like. When the carrier comprises an emulsion, the flavoring composition can also contain emulsifiers such as sorbitol derivatives, mono- and diglycerides of fatty acids, and the like. With these carriers or vehicles the desired physical form of the composition can be prepared. It will be understood that the mixtures of this invention can be used in spray-dried, liquid, encapsulated, emulsified, and other forms in which flavorings are added to foodstuffs. The mixtures can be so used alone or in combination with other ingredients set forth herein. It will be understood that the mixtures of this invention can be utilized to provide or supplement onion flavors in sauces such as barbecue and spaghetti sauces, meats such as frozen hamburger patties, seafoods including fish, crustaceans and mollusks, freeze-dried pork chops, and the like, soups, dried soup mixes, dehydrated soup mixes, and the like, gravies, salad dressings, spice mixes for preparation of, for example, vinegar-and-oil salad dressings, spreads such as butter or margarine, spreads for garlic bread, flavors for cottage cheese and other dairy products for salad use, cheese spreads, sour cream, cream cheese and other materials for use in dips, and the like.

The amount of the mixtures of this invention should be sufficient to impart the desired flavor and aroma qualities to the ultimate foodstuffs in which they are used. Thus, a small but effective amount of the mixture sufficient to provide the desired onion flavor note is used. The amount used will vary depending upon the ultimate food composition to be flavored; for example, more may be required in producing a full, rounded flavor from an unflavored material, and less may be required when the mixtures are used to enhance a natural product which is deficient in natural flavor or aroma.

Those skilled in the art will appreciate that the amount of the S-oxide or other material according to this invention can be varied over a range to provide the desired flavor and aroma. The use of too little of the mixture will not give the full benefit, while too much not only makes the flavor compositions and foodstuffs needlessly costly, but also can overwhelm and unbalance the flavor and aroma so that desirable results are not obtained. It is accordingly desirable that the ultimate food composition contain not more than about 5 parts per million (ppm) of S-oxide or its rearrangement product for each part of total composition, and it is generally preferred to use more than about 0.002 ppm in the finished composition. Accordingly, the desirable range in foods of the materials produced according to this invention is from about 0.002 to 5 ppm. The generally preferred range of the thioalkanal-S-oxide or mixtures thereof is from 0.002 to 0.03 ppm.

When the S-oxide, thiosulfonate, or other reaction product is added to the foodstuff in the form of a total flavor composition, the amount should be sufficient to impart the requisite flavor and/or aroma note to the food composition so that the flavor and aroma will be balanced in the finished foodstuff. Accordingly, the flavoring compositions of this invention preferably contain from about $10^{-4}$ percent to about $10^{-2}$ percent of the compound or compounds based upon the total weight of the flavoring composition. All parts, proportions, percentages, and ratios herein are by weight, unless otherwise specified.

The flavoring compositions of the present invention can be added to the foodstuffs by conventional means known in the art. The flavor material produced according to this invention, together with any other liquid if desired, can be admixed with a carrier such as gum arabic, gum tragacanth, carrageenen, and the like, and spray-dried to obtain a particulate solid flavoring material. When a powdered flavor mix is being made, the dried solids and mixtures of this invention are mixed together in a dry blender to obtain uniformity.

When liquid materials are involved in the preparation of foodstuffs, the flavoring materials of this invention can be combined with either the liquid to be used in the finished composition, or alternatively, they can be added with a liquid carrier in which they are dissolved, emulsified, or otherwise dispersed.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Synthesis of Thiopropanal-S-Oxide

A 100 ml three-neck flask provided with a dropping funnel, magnetic stirrer, and a nitrogen blanket is charged with 10.1 g (0.1 mole) of triethylamine and 60 ml of carbon tetrachloride. The compounds are cooled to −20° C using a dry ice-isopropanol bath, and 12.65 g (0.1 mole) of propyl sulfinyl chloride cooled to 0° C is slowly added to the flask. The temperature during addition is maintained between −20 and −25° C, and a precipitate forms in the mixture.

After addition is completed, the reaction mixture is filtered through a coarse sintered glass filter into a precooled suction flask. The filtrate is filtered twice utilizing filter paper and suction. A sample of the carbon tetrachloride solution is subjected to IR spectroscopy which indicates that the product is thiopropanal-S-oxide. This is confirmed by a mass spectral analysis showing a parent peak at 90 and two other prominent peaks at 73 and 45. PMR at −20° C confirms the structure by showing a doublet at 1.40 ppm, a multiplet at 8.40, and a triplet at 10.00.

EXAMPLE II

A 500 ml three-necked round-bottom flask equipped with a mechanical stirrer, thermometer, dropping funnel and nitrogen blanket is charged with 20.1100 g (0.199 mole) of triethylamine and dissolved in trichlorofluoromethane. The solution is cooled to −20° to −40° C with a dry ice-isopropanol bath, and 25.3027 g (0.199 mole) of propane sulfinyl chloride is added dropwise to the cooled reaction mixture. The reaction mixture is stirred at −40° to −20° C for 1 hour after the addition has been completed.

The reaction mixture is then placed in a rotary evaporator and the trichlorofluoromethane is removed under 100 mm Hg pressure to obtain a solid-liquid mixture. The mixture is transferred to stainless steel centrifuge tubes by using trichlorofluoromethane, and the tubes are centrifuged at −20° C for 1 hour. The solution is filtered, and the filter is placed on the rotary evaporator to remove the trichlorofluoromethane at 90 mm Hg pressure.

This provides 12.5 g of thiopropanal-S-oxide which is a colorless liquid boiling at 30° C at 0.10 mm Hg. PMR analysis in deuterotrichloromethane shows the following:

| Chemical Shift (δ; ppm) | Coupling Constant (J) | Integral Ratio | Assignment |
|---|---|---|---|
| 1.18 (triplet) | 7 Hz | 3 | $CH_3-C-C=$ |
| 2.80 (quintet) | 7 Hz | 2 | $-CH_2-C=$ |
| 8.14 (triplet) | 7 Hz | 1 | $HC=S=O$ |

A signal noted at 1.60 ppm is due to an impurity in the deuterotrichloromethane.

Similar results are obtained when the foregoing reaction is carried out with other halogenated hydrocarbons such as tetrafluoromethane, dibromodichloromethane and the like, aromatic hydrocarbons such as toluene, xylene and benzene; aliphatic hydrocarbons such as butane, pentane, hexane; and the like. Similarly, other lower tertiary alkylamines such as trimethylamine, tripropylamine, tributylamine, triethylenediamine, and the like can be used.

The thiopropanal-S-oxide and/or its rearrangement product improves the overall taste of roasted meat products, whether pure or combined with protein from other sources such as vegetable, fish, single-cell life forms and the like, at usage levels of 0.002–0.03 ppm. At the lowest usage levels, the novel product of this invention acts as an enhancer, while at higher levels, characteristic alliaceous flavor character is perceived. The product is also suitable for use as a flavor ingredient in related alliaceous flavors, such as chive, scallion, garlic, leek, and the like, and in such usage, levels of 0.1 ppm of the finished product provide good results.

EXAMPLE III

Th process of Example II is repeated utilizing 27.83 g (2.2 moles) of propyl sulfinyl chloride and 20.22 g (2.0 moles) of triethylamine. The yield of product is 17 g, or about 94.5 percent.

EXAMPLE IV

Synthesis of ThiobutanalS-Oxide

The procedure of Example II is repeated utilizing 20.22 g (0.20 moles) of triethylamine and 30.9 g (0.22 moles) of butyl sulfinyl chloride. The procedure produced 17.1 g of thiobutanal-S-oxide having a lachrymatory odor. PMR and mass spectral analysis confirm the structure.

EXAMPLE V

Synthesis of Thioethanal-S-Oxide

The procedure of Example II is repeated with the same molar quantities of ethyl sulfinyl chloride. PMR and mass spectral analysis confirm the structure of the thioethanal-S-oxide produced.

EXAMPLE VI

Synthesis of Thiohexanal-S-Oxide

Per the procedure of Example II, 25.3 g (0.15 moles) of hexyl sulfinyl chloride is reacted with 16.2 g (0.16 moles) of triethylamine in 250 ml of fluorotrichloromethane to produce 21 g of thiohexanal-S-oxide boiling at 30° C under 0.3 mm Hg. PMR analysis shows the following:

| Shift (ppm) | No. of protons | Assignment |
|---|---|---|
| 8.13 | 1 | $-CH=S=O$ |
| 2.75 | 2 | $-CH_2-CH=S=O$ |
| 1.39 | 6 | $CH_3(CH_2)_3-CH_2-CH=S=O$ |
| 0.89 | 3 | $CH_3(CH_2)_4-CH=S=O$ |

The thiohexanal-S-oxide so produced is useful in enhancing meat flavors.

EXAMPLE VII

A 250 ml flask fitted with a thermometer, dry ice condenser, agitator, and dropping funnel is charged with 10.1 g (0.10 moles) of triethylamine in 100 cc of fluorotrichloromethane, and 13.9 g of propyl sulfinyl chloride is added dropwise over a 5-minute period while the temperature is maintained at 22° to 30° C. When the addition is complete, the precipitate is removed by vacuum filtration, the filtrate is charged to a rotary evaporator, and the fluorotrichloromethane is removed at 90 mm Hg pressure.

The solid-liquid mixture obtained from the evaporator is centrifuged for one hour at −20° C, the solids are separated by filtration, and the fluorotrichloromethane is removed on the rotary evaporator at 90 mm Hg. No heat is added in the evaporation steps.

The procedure yields 7.5 g of thiopropanal-S-oxide.

EXAMPLE VIII

The product of Example II is dissolved in 95 percent ethanol to provide a 2 percent solution, and is held at room temperature for 24 hours. It is then diluted with water to 0.01 percent, and this solution has an aroma of fresh green onions.

Various water solutions are prepared, as shown in the following Table I and evaluated for taste:

TABLE I

| Concentration (ppm) | Evaluation |
|---|---|
| 0.002 | Green onion character; near threshold level |
| 0.010 | Fresh green onion taste |

The material is added to chicken broth to obtain a concentration of 0.010 ppm, and it is found that the chicken taste is deepened and that a light onion aftertaste is added. Increasing the concentration to 0.030 ppm adds an onion aroma, and the fresh onion taste is dominating.

Repetition of the foregoing with beef broth shows no significant difference at 0.010 ppm; a slightly lachrymatory aroma and an improved general taste at 0.030 ppm; and a dominating onion note with the beef broth changed to onion soup at 0.2 ppm.

It is judged that this flavor additive can replace all flavor areas where fresh onion is used, and it is interesting enough to be used alone to develop onion soup flavor characteristic.

EXAMPLE IX

Three meat-loaf type products are prepared according to the following formulation:

| Ingredient | Amount |
|---|---|
| TVP, minced | 1 cup |
| Ground beef | 1 cup |
| Water | 1 cup |
| Beef suet | ½ cup |
| Bread crumbs, dry, unflavored | 1 cup |
| Whole milk | 1 cup |
| Egg albumen | 3 tbsp. |
| Salt | 1 ¼ tbsp. |
| Black pepper | ¼ teasp. |
| Catsup | ¼ cup |
| Water | 32 ml. |

The "TVP" is a texturized vegetable protein mixture made by Archer-Daniels-Midland Company.

Three separate portions prepared according to the foregoing formulation are made into three meat loaves. Loaf A contains no additional additive, Loaf B contains 32 ml of fresh pressed onion juice to replace the 32 ml of water, and Loaf C contains 0.6 ppm of the rearrangement product produced in Example II.

The three loaves are baked at 350° F for 1 hour and evaluated for flavor by a panel of 12 judges. The consensus of the judges is that Loaves B and C are superior to Loaf A because the onion character of B and C enhances the overall taste and covers the dry, cardboard-like cereal character of Loaf A. It is accordingly apparent that the product of this invention is a valuable ingredient for a wide variety of flavors and types of foodstuffs.

EXAMPLE X

A three-neck 50 ml flask fitted with a thermometer, dropping funnel, and reflux condenser is charged with 2.96 g (0.02 moles) of propyl propenyl disulfide dissolved in 10 ml of glacial acetic acid, the solution is cooled to 10°–15° C, and 4.53 g (0.04 moles) of 30 percent hydrogen peroxide is slowly added to the flask, the temperature being maintained below 15° C. After addition of the peroxide is complete, the mixture is allowed to warm up to room temperature, and then the mixture is heated to 50° C, but care is taken so that the reaction mixture does not undergo a sharp exothermic temperature increase.

The reaction mixture is thereupon transferred to a 50 ml round bottom flask, and the water and acetic acid are removed on a rotary evaporator. The residue is extracted with saturated aqueous ammonium sulfate and is dried over anhydrous magnesium sulfate. The dried oil has the characteristic IR absorption of the thiosulfonate at 1,320 cm$^{-1}$ and 1,130 cm$^{-1}$.

The mixture is resolved by GLC into the propyl propene thiosulfonates which have a characteristic PMR absorption at 6.30 ppm. The thiosulfonates boils at 90° C at 0.05 mm Hg.

The thiosulfonate so produced can be used as onion flavoring material as shown in Examples VIII and IX.

EXAMPLE XI

A 10 ml flask is charged with 5 g of thiopropanal-S-oxide prepared as in Example I and placed on a short-path distillation apparatus utilizing a three-neck 25 ml flask as the receiver and a micro dry-ice condenser. A vacuum line is applied to the condenser, and a vacuum of 0.5 to 2.0 mm Hg is maintained while the S-oxide is heated to 35° C in ten minutes.

During this period, 1.5 ml of the pure S-oxide is obtained in the receiver. The remaining oil in the supply flask is heated to 50° C in a water bath for 30 minutes, and is found to have a flavor and aroma quite like fresh onions. A sample of this onion-like material is stored in a freezer and is found to maintain its onion-like character on being returned to room temperature for 24 hours. This oil does not become viscous.

Analysis of this oil by GLC and mass spectroscopy shows the presence of propyl propene thiosulfonate.

What is claimed is:

1. A process for imparting a fresh oniony flavor to foodstuffs comprising preparing a thioalkanal-S-oxide having the formula R=S=O wherein R is a straight chain alkylidene grou having from two to six carbon atoms by reacting an alkyl sulfinyl chloride and a lower tertiary amine at at a temperature below −15° C, maintaining the S-oxide obtained at a temperature above 10° C to form a rearrangement product, and adding a small but effective amount of said product to a foodstuff.

2. A process as defined in claim 1 wherein at least 0.002 ppm of said product are added to the foodstuff.

3. A process as defined in claim 1 wherein from 0.002 ppm to 5 ppm are added to the foodstuff.

4. A process for imparting a flavor to foodstuffs which process comprises adding a small amount of propyl propene thiosulfonate to a foodstuff, the amount being effective to impart a fresh onion flavor.

* * * * *

PO-1050
(5/69)

UNITED STATES PATENT OFFICE
CERTIFICATE OF CORRECTION

IFF 2129A

Patent No. 3,751,269      Dated  August 7, 1973

Inventor(s) MICHAEL H. BRODNITZ, JOHN V. PASCALE and MANFRED H. VOCK

It is certified that error appears in the above-identified patent and that said Letters Patent are hereby corrected as shown below:

Col. 8, lines 51-55, correct the column of the tabulation headed "Assignment" to read:

Assignment $-C\underline{H}=S=O$ $-C\underline{H}_2-CH=S=O$ $CH_3(C\underline{H}_2)_3-CH_2-CH=S=O$ $C\underline{H}_3(CH_2)_4-CH=S=O$ Claim 1, line 4 thereof, correct the spelling of "group".

Signed and sealed this 25th day of December 1973.

(SEAL)
Attest:

EDWARD M. FLETCHER, JR.
Attesting Officer

RENE D. TEGTMEYER
Acting Commissioner of Patents